US012794000B2

(12) United States Patent
Kim et al.

(10) Patent No.: US 12,794,000 B2
(45) Date of Patent: Nov. 10, 2026

(54) APPARATUS AND METHOD OF FOLDING POUCH CASE OF BATTERY CELL

(71) Applicant: SK On Co., Ltd., Seoul (KR)

(72) Inventors: Joo Hyung Kim, Daejeon (KR); Hyung Joon Kim, Daejeon (KR); Gil Yong Choi, Daejeon (KR); Poo Reum Oh, Daejeon (KR)

(73) Assignee: SK On Co., Ltd., Seoul (KR)

( * ) Notice: Subject to any disclaimer, the term of this patent is extended or adjusted under 35 U.S.C. 154(b) by 732 days.

(21) Appl. No.: 18/203,261

(22) Filed: May 30, 2023

(65) Prior Publication Data

US 2023/0369633 A1 Nov. 16, 2023

Related U.S. Application Data

(63) Continuation-in-part of application No. 17/034,940, filed on Sep. 28, 2020, now Pat. No. 11,695,177.

(30) Foreign Application Priority Data

Sep. 30, 2019 (KR) ........................ 10-2019-0121131
Sep. 23, 2020 (KR) ........................ 10-2020-0122800

(51) Int. Cl.

| | |
|---|---|
| ***H01M 10/04*** | (2006.01) |
| ***B29C 53/04*** | (2006.01) |
| ***H01M 50/105*** | (2021.01) |
| *B29L 31/34* | (2006.01) |

(52) U.S. Cl.

CPC ....... *H01M 10/0404* (2013.01); *B29C 53/043* (2013.01); *H01M 50/105* (2021.01); *B29L 2031/3468* (2013.01)

(58) Field of Classification Search

CPC ........................ H01M 10/0404; H01M 50/105
See application file for complete search history.

(56) References Cited

U.S. PATENT DOCUMENTS

| | | | | |
|---|---|---|---|---|
| 8,697,277 | B2 | 4/2014 | Otohata et al. | |
| 2009/0023058 | A1 | 1/2009 | Kim | |
| 2009/0140931 | A1 | 6/2009 | Cho et al. | |
| 2014/0182119 | A1 * | 7/2014 | Otohata | B29C 66/0324 29/623.2 |
| 2019/0027714 | A1 | 1/2019 | Jung et al. | |
| 2020/0111999 | A1 | 4/2020 | Kim et al. | |

FOREIGN PATENT DOCUMENTS

| | | | |
|---|---|---|---|
| CN | 101453055 | A | 6/2009 |
| CN | 108431986 | A | 8/2018 |
| CN | 109997242 | A | 7/2019 |

(Continued)

OTHER PUBLICATIONS

KR20170033588 translation (Year: 2017).*

*Primary Examiner* — Jane J Rhee
(74) *Attorney, Agent, or Firm* — The Webb Law Firm

(57) ABSTRACT

The present invention relates to an apparatus and a method of folding a pouch case of a battery cell, and more particularly, to an apparatus and a method of folding a pouch case of a battery cell capable of preventing a meandering in a folding process and reducing non-uniformity of a folding amount by forming a pre-folding line on a pouch wing and folding the pouch wing on the basis of the pre-folding line.

6 Claims, 15 Drawing Sheets

(56) References Cited

FOREIGN PATENT DOCUMENTS

| | | | |
|---|---|---|---|
| JP | 2001291497 | B2 | 10/2001 |
| JP | 4788889 | B2 | 10/2011 |
| JP | 2013157286 | A | 8/2013 |
| KR | 20000067807 | A | 11/2000 |
| KR | 20030093362 | A | 12/2003 |
| KR | 100670427 | B1 | 1/2007 |
| KR | 101245282 | B1 | 3/2013 |
| KR | 1020140005614 | A | 1/2014 |
| KR | 1020140026158 | A | 3/2014 |
| KR | 1020140064406 | A | 5/2014 |
| KR | 1020150061837 | A | 6/2015 |
| KR | 1020150072107 | A | 6/2015 |
| KR | 1020150125263 | A | 11/2015 |
| KR | 1020170033588 | A | 3/2017 |
| KR | 1020170053011 | A | 5/2017 |
| KR | 101766966 | B1 | 8/2017 |
| KR | 101802296 | B1 | 11/2017 |
| KR | 1020180010563 | A | 1/2018 |
| KR | 1020180018051 | B1 | 2/2018 |
| KR | 101958882 | B1 | 3/2019 |
| KR | 101974443 | B1 | 5/2019 |
| KR | 102104319 | B1 | 4/2020 |
| KR | 102132593 | B1 | 7/2020 |
| KR | 102146944 | B1 | 8/2020 |
| KR | 102148997 | B1 | 8/2020 |

* cited by examiner

APPARATUS AND METHOD OF FOLDING POUCH CASE OF BATTERY CELL

CROSS-REFERENCE TO RELATED APPLICATIONS

This application is a continuation-in-part of U.S. patent application Ser. No. 17/034,940, which claims priority to Korean Patent Application No. 10-2019-0121131 filed Sep. 30, 2019, and Korean Patent Application No. 10-2020-0122800, filed on Sep. 23, 2020, the disclosures of which are incorporated herein by reference in their entireties.

TECHNICAL FIELD

The following disclosure relates to an apparatus and a method of folding a pouch case of a battery cell, and more particularly, to an apparatus and a method of folding a pouch case of a battery cell capable of preventing a meandering in a folding process and reducing non-uniformity of a folding amount by forming a pre-folding line on a pouch wing and folding the pouch wing on the basis of the pre-folding line.

BACKGROUND

A secondary battery has been prominent as a power source of an electric vehicle (EV), a hybrid electric vehicle (HEV), and the like, suggested as a method for solving air pollution of an existing gasoline vehicle, a diesel vehicle or the like that uses a fossil fuel.

Meanwhile, in order to load the secondary battery into a vehicle, it has been required to improve en energy density and solve a problem such as a spatial constraint, and as a means for improving the energy density and solving problem such as the spatial constraint, a large-width battery cell having a much larger edge length between electrode tabs than at edges where the electrode tabs are positioned has been proposed. A general battery cell has a width of 300 mm or less, while the large-width battery cell has a width of 600 mm, and an ultra-large-width battery cell is designed to have a width of 600 mm or more.

However, in the large-width or ultra-large-width battery cell, a length between electrode tabs becomes long, such that a possibility that a defect will occur due to a meandering or a problem that a folding width becomes non-uniform will occur in a battery folding process is increased.

Therefore, a method capable of reducing the meandering and uniformly maintaining the folding width in the folding process is required.

RELATED ART DOCUMENT

Patent Document

Korean Patent Publication No. 1766966 (2017.08.09.)

SUMMARY

An embodiment of the present invention is directed to providing an apparatus and a method of folding a pouch case of a battery cell capable of preventing a meandering in a folding process and reducing non-uniformity of a folding amount by forming a pre-folding line on a pouch wing and folding the pouch wing on the basis of the pre-folding line.

In one general aspect, an apparatus of folding a pouch case including a pouch body in which an electrode assembly is accommodated and a pouch wing extending from the pouch body, includes: a line forming unit forming a pre-folding line recessed at a predetermined depth along a length direction of the pouch wing on the pouch wing; and a folding unit arranged on a path through which the pouch case is transported and folding the pouch wing on which the pre-folding line is formed, on the basis of the pre-folding line.

The folding unit may include a plurality of unit rollers arranged along the path through which the pouch case is transported, at least one of the plurality of unit rollers may include an upper roller and a lower roller and an accommodating groove in which a portion protruding downward of the pre-folding line is accommodated may be formed in the lower roller, and the lower roller may be formed so that an outer side of the accommodating groove has a predetermined angle with respect to a horizontal direction, such that the pouch wing is folded on the basis of the pre-folding line.

The line forming unit may include a pre-heating press heat-pressing the pouch wing in order to soften the pouch wing and a line forming press pressing the pouch wing softened by the pre-heating press to form the pre-folding line, the line forming press may include an upper pressing surface and a lower pressing surface that compress the pouch wing, a protruding portion protruding downward and extending to be elongated in the length direction of the pouch wing may be formed on the upper pressing surface, and an avoiding portion depressed downward so as to correspond to the protruding portion of the upper pressing surface may be formed in the lower pressing surface, and the pouch wing may be softened by compression of the pre-heating press, and the pre-folding line may be formed on the softened pouch wing by compression of the line forming press.

The line forming unit may include a heating press for forming the pre-folding line simultaneously with softening the pouch wing by heat-pressing the pouch wing, the heating press may include an upper pressing surface and a lower pressing surface that compress the pouch wing, a protruding portion protruding downward and extending to be elongated in the length direction of the pouch wing may be formed on the upper pressing surface, and an avoiding portion depressed downward so as to correspond to the protruding portion may be formed in the lower pressing surface, and the pre-folding line may be formed on the pouch wing simultaneously with the softening of the pouch wing by compression of the heating press.

The line forming unit may include a first heating press forming a first pre-folding line on the pouch wing and a second heating press forming a second pre-folding line on the pouch wing on which the first pre-folding line is formed, the folding unit may include a first folding unit folding the pouch wing on which the first pre-folding line is formed, by 90°, a second folding unit folding the pouch wing folded by 90° by 180°, and a third folding unit additionally folding the pouch wing folded by 180° by 90°, and the first folding unit may fold the pouch wing by 90° on the basis of the first pre-folding line, the second folding unit may fold the pouch wing folded by 90° on the basis of the first pre-folding line by 180°, and the third folding unit may additionally fold the pouch wing folded by 180° by 90° on the basis of the second folding line.

The first pre-folding line may be formed on a sealing surface of the pouch wing, and the second pre-folding line may be formed on a non-sealing surface of the pouch wing.

A heat and a pressure applied to the pouch wing by the second heating press in order to form the second pre-folding line may be lower than a heat and a pressure applied to the pouch wing by the first heating press in order to form the first pre-folding line.

The first heating press may form the first pre-folding line on the pouch wing before the first folding unit folds the pouch wing by 90°, and the second heating press may form the second pre-folding line on the pouch wing folded by 180° after the second folding unit folds the pouch wing by 180° and before the third folding unit additionally folds the pouch wing folded by 180° by 90°.

The second heating press may include a folded portion upper pressing surface and a folded portion lower pressing surface that compress a 180° folded portion of the pouch wing formed by folding the pouch wing by 180°, the folded portion upper pressing surface may be formed at a position higher than the upper pressing surface, and the folded portion lower pressing surface may be formed on the same line as the lower pressing surface.

The first folding unit may include a plurality of first unit rollers arranged along the path through which the pouch case is transported, each of the plurality of first unit rollers including an upper roller and a lower roller, the third folding unit may include a plurality of third unit rollers arranged along the path through which the pouch case is transported, each of the plurality of third unit rollers including an upper roller and a lower roller, and an accommodating groove in which a portion protruding downward of the first pre-folding lie is accommodated may be formed in the lower roller of the first unit roller, and an accommodating groove in which a portion protruding downward of the second pre-folding lie is accommodated may be formed in the lower roller of the third unit roller.

In another general aspect, a method of folding a pouch case including a pouch body in which an electrode assembly is accommodated and a pouch wing extending from the pouch body, includes: forming a pre-folding line recessed at a predetermined depth along a length direction of the pouch wing on the pouch wing; and folding the pouch wing on which the pre-folding line is formed, on the basis of the pre-folding line.

The forming of the pre-folding line may include forming a first pre-folding line on the pouch wing and forming a second pre-folding line on the pouch wing on which the first pre-folding line is formed, the folding of the pouch wing may include folding the pouch wing on which the first pre-folding line is formed, by 90°, folding the pouch wing folded by 90° by 180°, and additionally folding the pouch wing folded by 180° by 90°, the first pre-folding line may be formed on the pouch wing, the pouch wing on which the first pre-folding line is formed may be folded by 90°, the pouch wing folded by 90° may be folded by 180°, the second pre-folding line may be formed on the pouch wing folded by 180°, and the pouch wing on which the second pre-folding line is formed may be additionally folded by 90°.

The first pre-folding line may be formed on a sealing surface of the pouch wing, and the second pre-folding line may be formed on a non-sealing surface of the pouch wing.

A heat and a pressure applied to the pouch wing in order to form the second pre-folding line may be lower than a heat and a pressure applied to the pouch wing in order to form the first pre-folding line.

In the forming of the second pre-folding line on the pouch wing folded by 180°, compression of a power wing folded portion formed by folding the pouch wing by 180° may be simultaneously performed.

In still another general aspect, a secondary battery includes a pouch body accommodating an electrode assembly and a pouch wing extending from the pouch body, wherein the pouch wing includes a sealing surface and a non-sealing surface, and a first pre-folding line recessed at a predetermined depth along a length direction of the pouch wing in order to fold the pouch wing is formed on the sealing surface.

The first pre-folding line may be formed by thermo-compression and have deterioration characteristics different from those of the sealing surface.

A second pre-folding line recessed at a predetermined depth along the length direction of the pouch wing in order to fold the pouch wing may be further formed on the non-sealing surface.

The first folding line and the second folding line may have different deterioration characteristics.

DETAILED DESCRIPTION OF MAIN ELEMENTS

10: battery cell
m: pouch body
w: pouch wing
PFL: pre-folding line
PFL1, PFL2: First and second pre-folding lines
100: line forming unit
100A, 100B: line forming units according to first and second embodiments
200: folding unit
200A, 200B, 200C: first, second, and third folding units
300: compressing unit
300A, 300B: first and second compressing units

DETAILED DESCRIPTION OF EMBODIMENTS

Hereinafter, the present invention will be described in detail with reference to the accompanying drawings.

Figure 1:
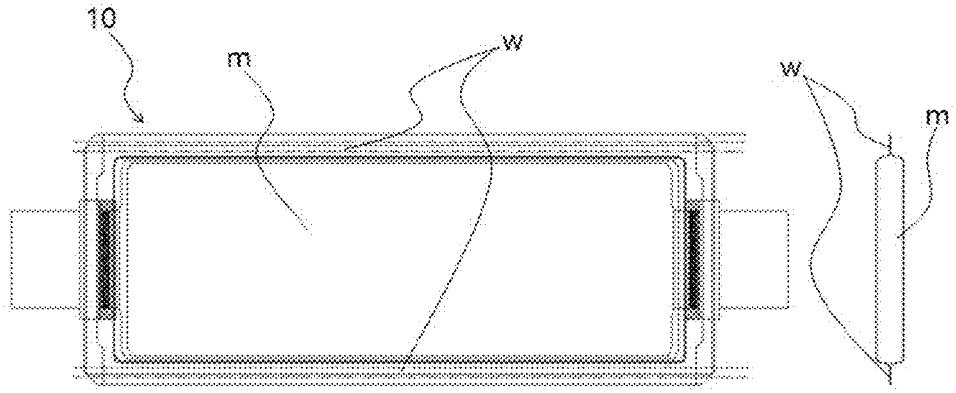
FIG. 1 illustrates a battery cell according to the present invention.

FIG. 1 illustrates a battery cell according to the present invention, in which a left side of FIG. 1 is a plan view of the battery cell and a right side of FIG. 1 is a side view of the battery cell. A battery cell 10 includes an electrode assembly and a pouch case in which the electrode assembly is accommodated, wherein the pouch case includes a pouch body m in which the electrode assembly is accommodated and pouch wings w extending from the pouch body.

Generally, the pouch case of the battery cell includes an upper pouch and a lower pouch, and the electrode assembly is accommodated between the upper pouch and the lower pouch. To this end, the upper pouch and the lower pouch are provided with electrode assembly accommodating portions formed at a predetermined depth in order to accommodate the electrode assembly. In addition, when side portions at which the upper pouch and the lower pouch are in contact with each other around the electrode assembly accommodating portions are sealed and are then folded, a battery cell having a width of a defined size may be manufactured. In the battery cell as described above, portions corresponding to the electrode assembly accommodating portions of the upper pouch and the lower pouch correspond to the pouch body m according to the present invention, and side portions on both sides of the battery cell except for terrace portions at which electrode tabs are positioned among the side portions at which the upper pouch and the lower pouch are in contact with each other around the electrode assembly, that is, long axes of the side portions correspond to the pouch wings w according to the present invention. Meanwhile, in the present invention, a length direction refers to a direction from an electrode tab protruding to one side to an electrode tab protruding to the other side in the electrode assembly as illustrated in FIG. 1.

Figure 2:
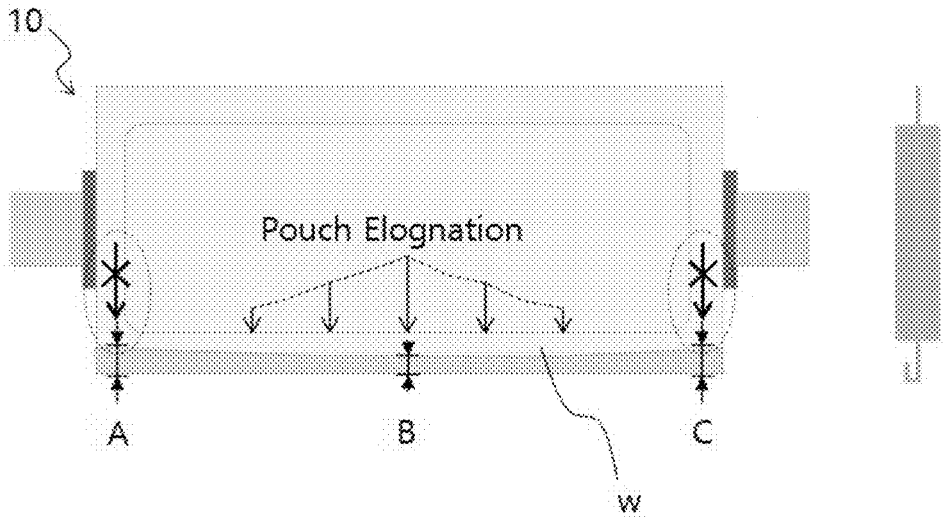
FIG. 2 illustrates a difference in an elongation amount at each position of a pouch wing in a case where the pouch wing is folded by 180°.

FIG. 2 illustrates a difference in an elongation amount at each position of a pouch wing in a case where the pouch wing is folded by 180°. In FIG. 2, positions of both distal ends of the pouch wing w in the length direction are denoted by A and C, respectively, and a middle position of the pouch wing w in the length direction is denoted by B. In regions A and C, generation of elongation is prevented due to the terrace portions, which are short axes among the side portions of the pouch case that are packaging-side-sealed, such that the elongation is hardly generated, while in a region B, there is no structure of preventing generation of elongation, such as the terrace portions, such that elongation larger than that in the regions A and C is generated. That is, a sealing surface of the pouch has a higher rigidity than that of a non-sealing surface, and thus, does not elongate well as compared with the non-sealing surface. Therefore, the regions A and C have a small elongation amount due to the sealing surfaces of the terrace portions, where the region B has a large elongation amount since there are no such structures. As described above, a difference in the elongation is generated between the end portions A and C of the pouch wing w and the central portion B of the pouch wing w, such that a meandering is generated in the folding line at the time of folding the pouch wing w. In particular, in a case of a large-width or ultra-large-width battery cell, large folding non-uniformity due to the meandering may appear.

Figure 3:
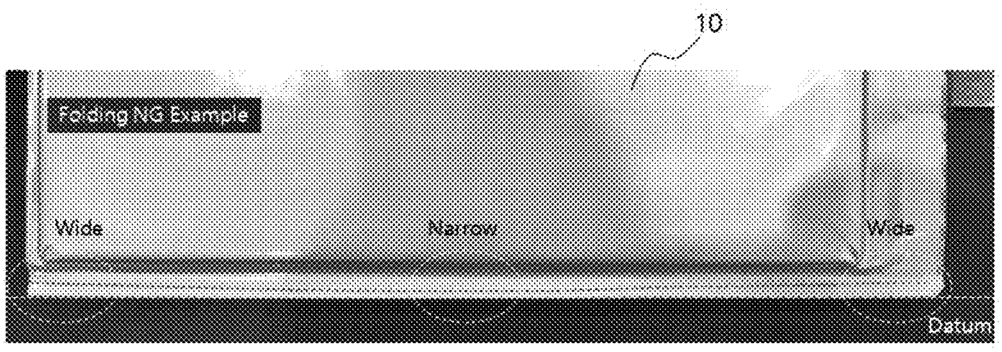
FIG. 3 illustrates an example in which a folding defect actually occurs in a case where the pouch wing is folded by 180°.

FIG. 3 is a photograph illustrating an example in which a folding defect actually occurs in a case where the pouch wing is folded by 180°. As illustrated in FIG. 3, due to the difference in the elongation amount at each point, a folding amount at both ends of the pouch wing w may be large and a folding amount at a central portion of the pouch wing w may be small. Here, factors having an influence on a decrease in a folding amount of the central portion are a forming depth of a battery cell assembly at the time of packaging-side-sealing the pouch case and a height of resealing and a degassing state at the time of degassing, and in common, as a length of the battery cell increases, a length of a region that may be elongated increases, such that a risk that a folding failure will occur increases in a battery cell has a large width.

The present invention may overcome the difference in the elongation amount at each position and prevent a meandering in a folding process by forming a pre-folding line PFL on the pouch wing w and folding the pouch wing w on the basis of the pre-folding line PFL, in order to solve such problems.

To this end, an apparatus of folding a pouch case of a battery cell includes a line forming unit 100 forming a pre-folding line PFL recessed at a predetermined depth along a length direction of the pouch wing w on the pouch wing w and a folding unit 200 arranged on a path through which the pouch case is transported and folding the pouch wing w on which the pre-folding line PFL is formed, on the basis of the pre-folding line PFL.

Figure 4:
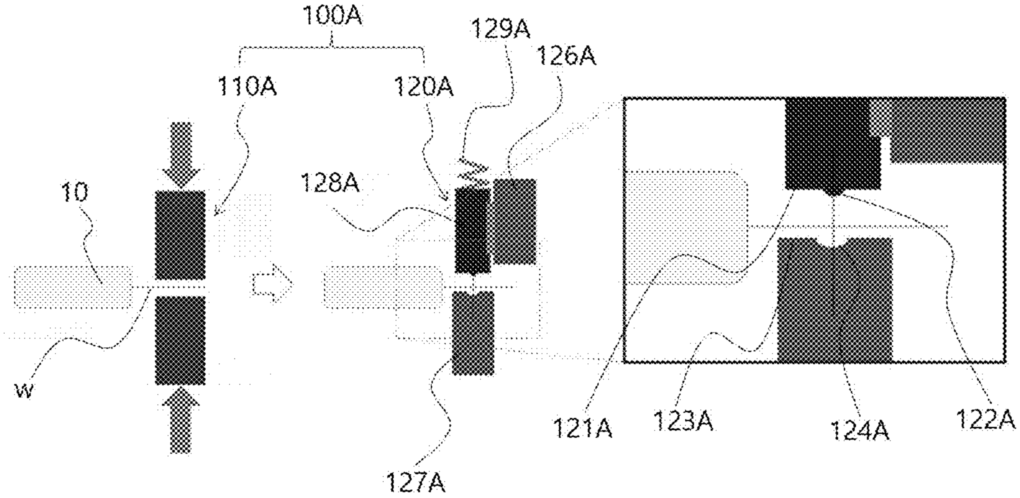
FIG. 4 illustrates a line forming unit according to a first embodiment of the present invention.

FIG. 4 illustrates a line forming unit according to a first embodiment of the present invention. As illustrated in FIG. 4, the line forming unit 100A according to the first embodiment of the present invention may include a pre-heating press 110A heat-pressing the pouch wing w in order to soften the pouch wing w whose rigidity is increased by sealing and a line forming press 120A pressing the pouch wing w softened by the pre-heating press 110A to form the pre-folding line PFL. As described above, the pre-folding line PFL recessed downward of the pouch wing w may be formed by heat-pressing the pouch wing w through the pre-heating press 110A to soften the pouch wing w and pressing the softened pouch wing w through the line forming press 120A.

The line forming press 120A includes an upper pressing surface 121A and a lower pressing surface 123A that compress the pouch wing w, a protruding portion 122A protruding downward and extending to be elongated in the length direction of the pouch wing w is formed on the upper pressing surface 121A, and an avoiding portion 124A depressed downward so as to correspond to the protruding portion 122A of the upper pressing surface is formed in the lower pressing surface 123A. Therefore, the pouch wing w may be softened through compression of the pre-heating press 110A, and the pre-folding line PFL may be formed on the softened pouch wing w through compression of the line forming press 120A. In this case, a knife is further provided on one side of an upper press of the line forming press 120A. Therefore, when the upper press descends, the knife descends together with the upper press, such that forming of the pre-folding line PFL and cutting of the pouch wing w may be simultaneously performed. More specifically, the line forming press 120A includes an upper knife 126A, a lower knife 127A, a stripper 128A, and an elastic part 129A. The line forming press 120A forms a pre-folding line on the softened sealing surface at the same time as the stripper 128A descends when the pouch is finally cut. At this time, the shape of the pre-folding line is changed by changing the shape of the stripper 128A and the lower knife 127A, and the depth of the pre-folding line is adjusted by adjusting the elasticity of the elastic part 129A. As such, the folding device of the present invention can reduce the risk of meandering occurring during folding by softening the sealing portion of the pouch wing and forming a pre-folding line after vision alignment of the battery cell.

Figure 5:
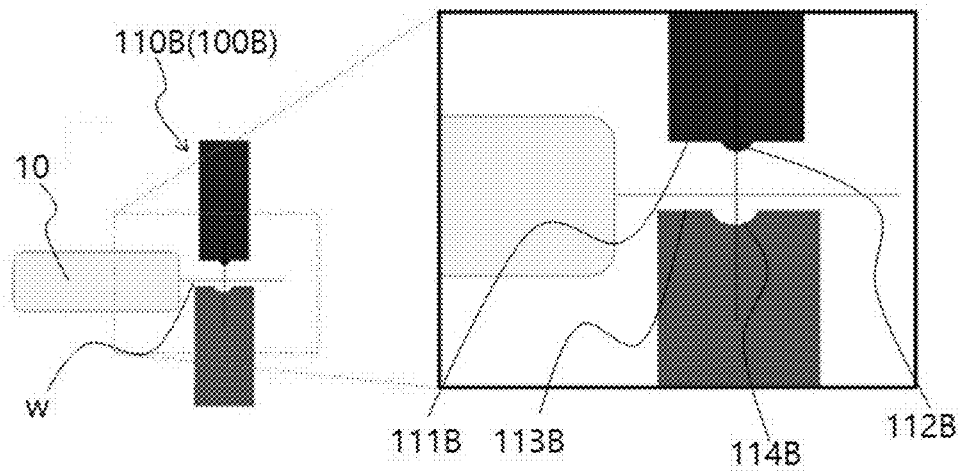
FIG. 5 illustrates a line forming unit according to a second embodiment of the present invention.
Figure 6:
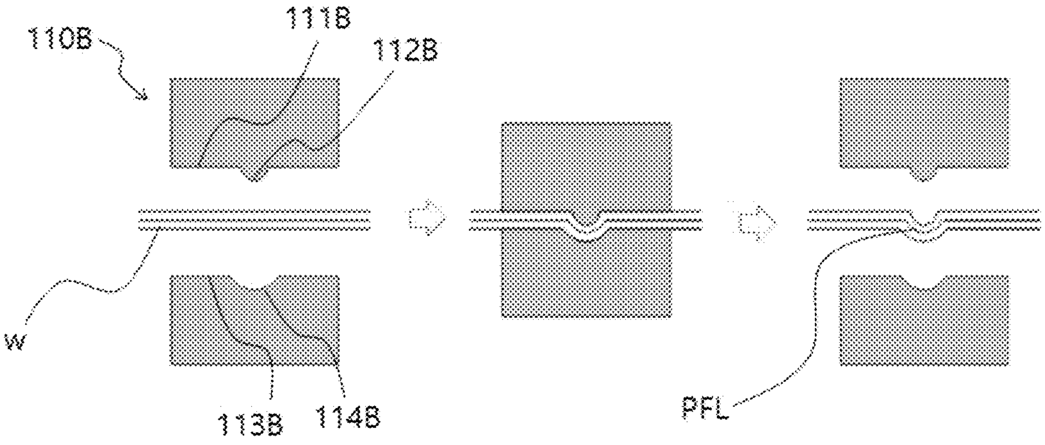
FIG. 6 illustrates forming a pre-folding line by pressing the pouch wing with the line forming unit of FIG. 5.

FIG. 5 illustrates a line forming unit according to a second embodiment of the present invention, and FIG. 6 illustrates forming a pre-folding line by pressing the pouch wing with the line forming unit according to the second embodiment. As illustrated in FIGS. 5 and 6, the line forming unit 100B according to the second embodiment of the present invention may include a heating press 110B for forming the pre-folding line PFL simultaneously with softening the pouch wing w by heat-pressing the pouch wing w, the heating press 110B may include an upper pressing surface 111B and a lower pressing surface 113B that compress the pouch wing, a protruding portion 112B protruding downward and extending to be elongated in the length direction of the pouch wing w may be formed on the upper pressing surface 111B, and an avoiding portion 114B depressed downward so as to correspond to the protruding portion 112B may be formed in the lower pressing surface 113B. Therefore, the pre-folding line PFL may be formed on the pouch wing w simultaneously with the softening of the pouch wing w by compression of the heating press 110B.

The line forming unit 100B according to the second embodiment of the present invention may form the pre-folding line PFL simultaneously with the softening of the sealing surface only with the heating press 110B to decrease the number of processes and increase a process speed as compared with the line forming unit 100A according to the first embodiment including the pre-heating press 110A and the line forming press 120A.

Figure 7:
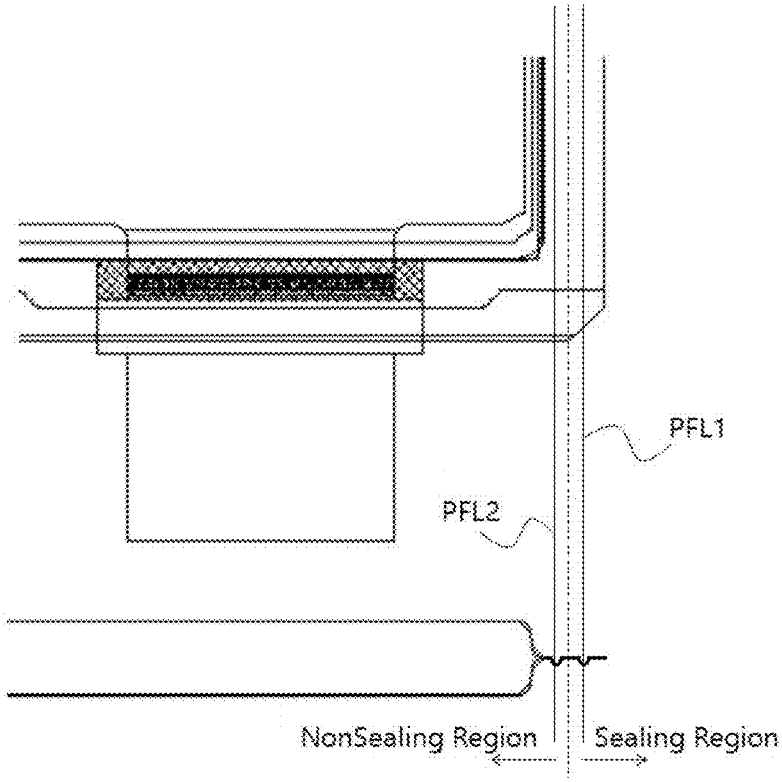
FIG. 7 illustrates a battery cell in which the pre-folding line is formed on the pouch wing.

FIG. 7 illustrates a battery cell in which the pre-folding line is formed on the pouch wing by the line forming unit. As illustrated in FIG. 7, the pre-folding line PFL recessed downward of the pouch wing w may be formed on the pouch wing w. Meanwhile, in the present invention, a sealing surface S, which is a region in which the upper pouch and the lower pouch are sealed at the time of packaging-side-sealing the pouch case, may be formed on the pouch wing w. The sealing surface S may be formed over the entire region of the pouch wing w, but since it is preferable that the sealing surface S is formed only on an outer side portion of the pouch wing w when considering an insulation resistance of the battery cell. Therefore, as illustrated in FIG. 7, a sealing region may be formed only on the outer side portion of the pouch wing, and a non-sealing region may be formed on an inner side portion of the pouch wing w.

The line forming unit 100B according to the second embodiment may include a first heating press 110B-1 forming a first pre-folding line PFL1 on the pouch wing w and a second heating press 110B-2 forming a second pre-folding line PFL2 on the pouch wing on which the first pre-folding line PFL1 is formed. Therefore, as illustrated in FIG. 7, the first pre-folding line PFL1 and the second pre-folding line PFL2 may be formed on the pouch wing w. In this case, the first pre-folding line PFL1 may be formed on the sealing surface of the pouch wing, and the second pre-folding line PFL2 may be formed on the non-sealing surface of the pouch wing. As described above, at the time of packaging-side-sealing the pouch case, the sealing surface S may be formed only on the outer side of the pouch wing w. Therefore, the first pre-folding line PFL1 may be formed on the outer side of the pouch wing w, and the second pre-folding line PFL2 may be formed on the inner side of the pouch wing w as compared with the first pre-folding line PFL1.

In this case, it may be preferable that a heat and a pressure applied to the pouch wing w by the second heating press 110B-2 in order to form the second pre-folding line PFL2 are lower than a heat and a pressure applied to the pouch wing w by the first heating press 110B-1 in order to form the first pre-folding line PFL1. For example, as conditions for forming the second pre-folding line PFL2, a temperature of the second heating press 110B-2 may be 90° C. to 120° C. and a pressure of the second heating press 110B-2 may be 0.2 to 0.4 Mpa, and as conditions for forming the first pre-folding line PFL1, a temperature and a pressure of the first heating press 110B-1 may be greater than those of the second heating press 110B-2. Since the first pre-folding line PFL1 is formed on the sealing surface formed by melting a polypropylene (PP) layer in the pouch, even though a high temperature or a high pressure is applied to the pouch wing w, a probability that a defect of an insulation resistance will occur is low, while since the second pre-folding line PFL2 is formed on the non-sealing surface, in a case where a high temperature or a high pressure is applied to the pouch wing w, the PP layer in the pouch is melted, such that a probability that a defect of an insulation resistance will occur is high, and as compared with the first pre-folding line PFL1, the second pre-folding line PFL2 is positioned closer to a body direction, that is, the pouch body m in which the electrode assembly is accommodated, and thus receives a greater insulation influence. Therefore, it is preferable to ease the conditions for forming the second pre-folding line PFL2 as compared with the conditions for forming the first pre-folding line PFL1.

A heat and a pressure should be applied from the outside to the pouch wing in order to form the first pre-folding line PFL1 and the second pre-folding line PFL2. As a result, chemical and/or physical properties of the pouch wing w are changed, such that deterioration characteristics of the first pre-folding line PFL1 and the sealing surface except for the first pre-folding line PFL1 may become different from each other and deterioration characteristics of the second pre-folding line PFL2 and the non-sealing surface except for the second pre-folding line PFL2 may become different from each other. In addition, in a case where conditions for forming the first pre-folding line PFL1 and the second pre-folding line PFL2 are made to be different from each other, deterioration characteristics of the first pre-folding line PFL1 and deterioration characteristics of the second pre-folding line PFL2 may become different from each other.

Here, the first and second pre-folding lines PFL1 and PFL2 may be formed and the conditions for forming the first pre-folding line PFL1 and the second pre-folding line PFL2 may be made to be different from each other, using two sets of pre-heating presses 110A and line forming presses 120A according to the first embodiment as well as the line forming unit 100B according to the second embodiment. In addition, the first and second pre-folding lines PFL1 and PFL2 may be formed using one heating press 110B or one set of pre-heating press 110A and line forming press 120A in a manner of moving the pouch case.

Meanwhile, the folding unit 200 includes a plurality of unit rollers 210 arranged along the path through which the pouch case is transported, at least one of the plurality of unit rollers 210 includes an upper roller 211 and a lower roller 212, an accommodating groove 213 in which a portion protruding downward of the pre-folding line PFL is accommodated is formed in the lower roller 212, and the lower roller 212 is formed so that an outer side of the accommodating groove 212*c* has a predetermined angle with respect to a horizontal direction, such that the pouch wing w may be folded on the basis of the pre-folding line PFL.

More specifically, the folding unit 200 may include a first folding unit 200A folding the pouch wing by 90°, a second folding unit 200B folding the pouch wing folded by 90° by 180°, and a third folding unit 200C additionally folding the pouch wing folded by 180° by 90°. Therefore, the pouch wing w may be folded by 270° in total. In this case, the first folding unit 200A may include a plurality of first unit rollers 210A arranged along the path through which the pouch case is transported, each of the first unit rollers 210A may include an upper roller 211A and a lower roller 212A, the third folding unit 200C may include a plurality of third unit rollers 210C arranged along the path through which the pouch case is transported, each of the third unit rollers 210C may include an upper roller 211C and a lower roller 212C, an accommodating groove 213A in which a portion protruding downward of the first pre-folding line PFL1 is accommodated may be formed in the lower roller 212A of the first unit roller 210A, and an accommodating groove 213C in which a portion protruding downward of the second pre-folding line PFL2 is accommodated may be formed in the lower roller 212C of the third unit roller 210C.

Figure 8A:
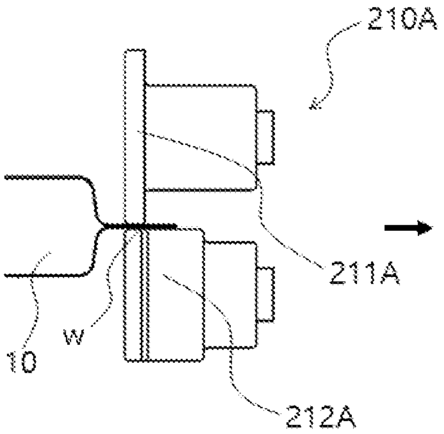
FIGS. 8A to 8D illustrate side surfaces of first unit rollers of a first folding unit.
Figure 8B:
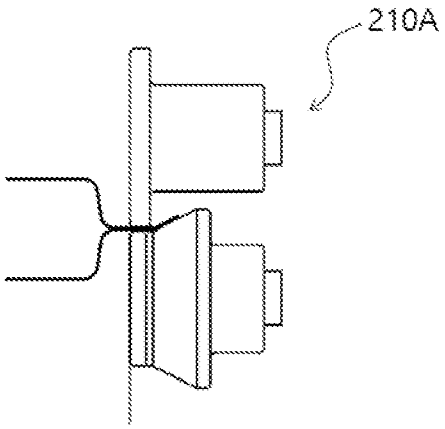
Figure 8C:
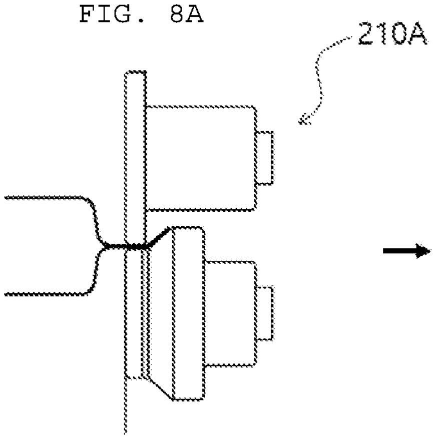
Figure 8D:
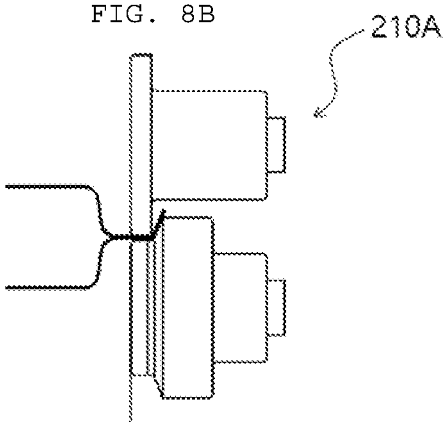
Figure 9:
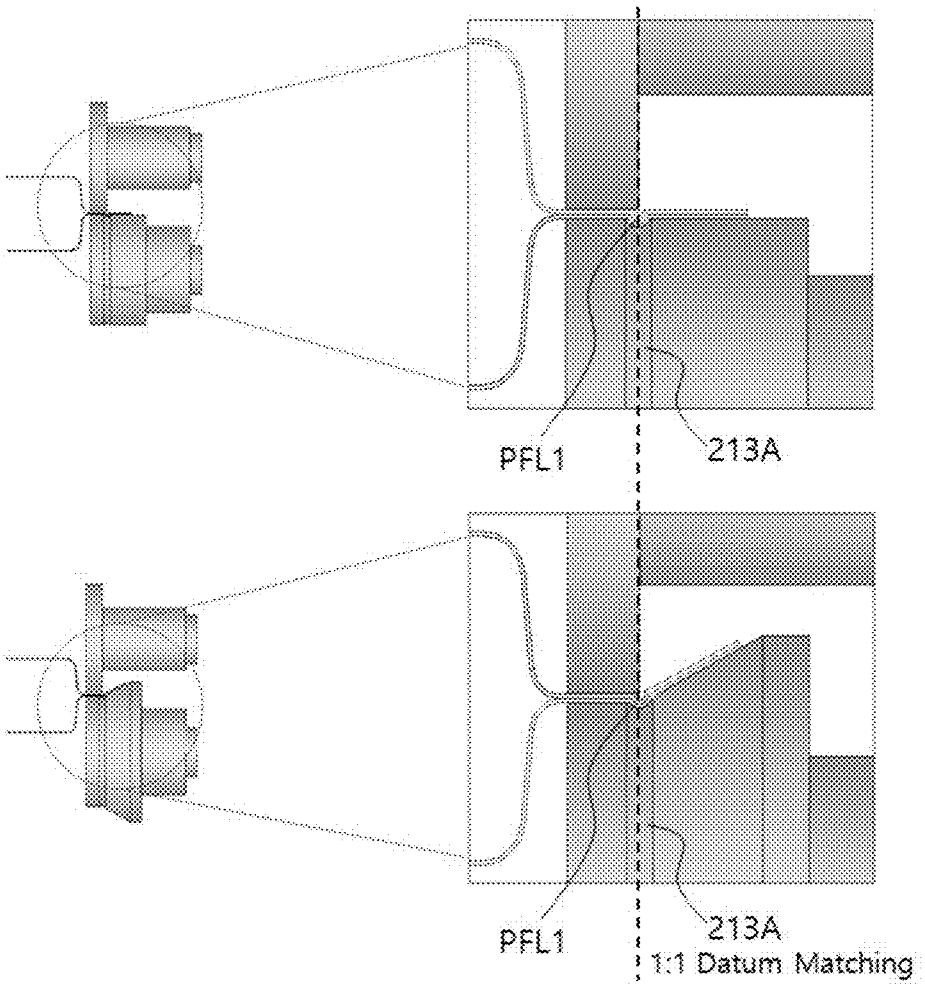
FIG. 9 illustrates the first unit roller of FIG. 8A and the first unit roller of FIG. 8C.

FIGS. 8A to 8D illustrate side surfaces of the first unit rollers of the first folding unit, and FIG. 9 illustrates the first unit roller (upper portion of FIG. 9) of FIG. 8A and the first unit roller (lower portion of FIG. 9) of FIG. 8C. This will be specifically described with reference to FIGS. 8A to 9. Each first unit roller 210A includes the upper roller 211A and the lower roller 212A. In this case, the accommodating groove 213A in which a portion protruding downward of the first pre-folding line PFL1 is accommodated may be formed in the lower roller 212A, and the lower roller 212A is formed so that an outer side of the accommodating groove 213A has a predetermined angle with respect to the horizontal direction. Here, the outer side of the accommodating groove 213A refers to an opposite side to a body direction, that is, a direction toward the pouch body m. In addition, the predetermined angle that the lower roller 212A of the first unit roller has with respect to the horizontal direction may be 0° or more and 90° or less, and each first unit roller 210A is arranged so that an inclined angle of the lower roller 212A of each first unit roller is increased toward a direction in which the pouch case is transported, such that the pouch wing w may be folded with a concave portion of the first pre-folding line PFL1 being an inner side on the basis of the first pre-folding line PFL1.

Figure 10A:
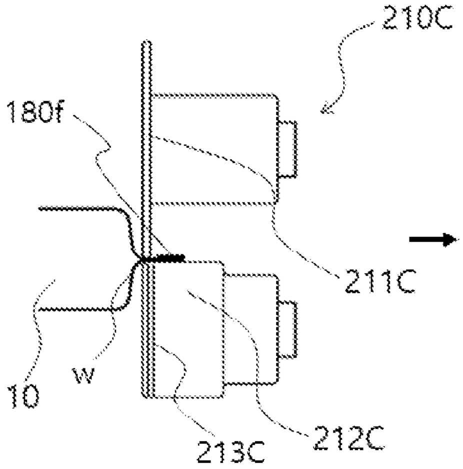
FIGS. 10A to 10D illustrate side surfaces of third unit rollers of a third folding unit.
Figure 10B:
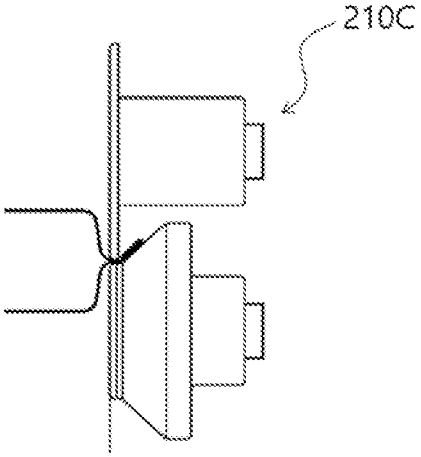
Figure 10C:
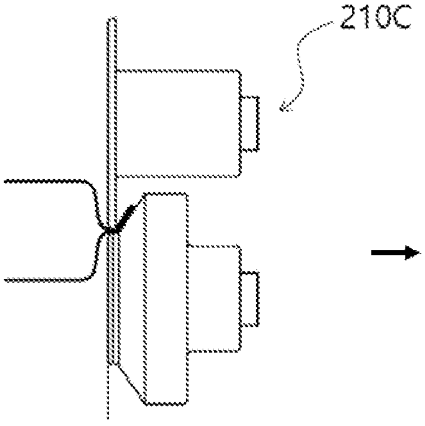
Figure 10D:
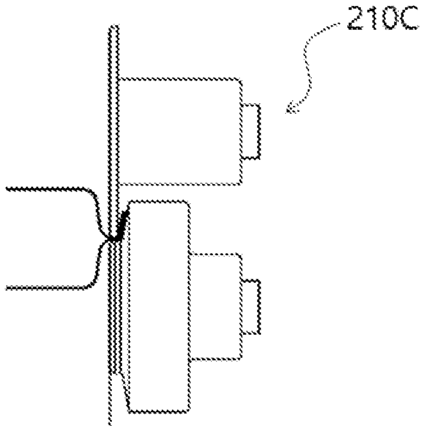
Figure 11:
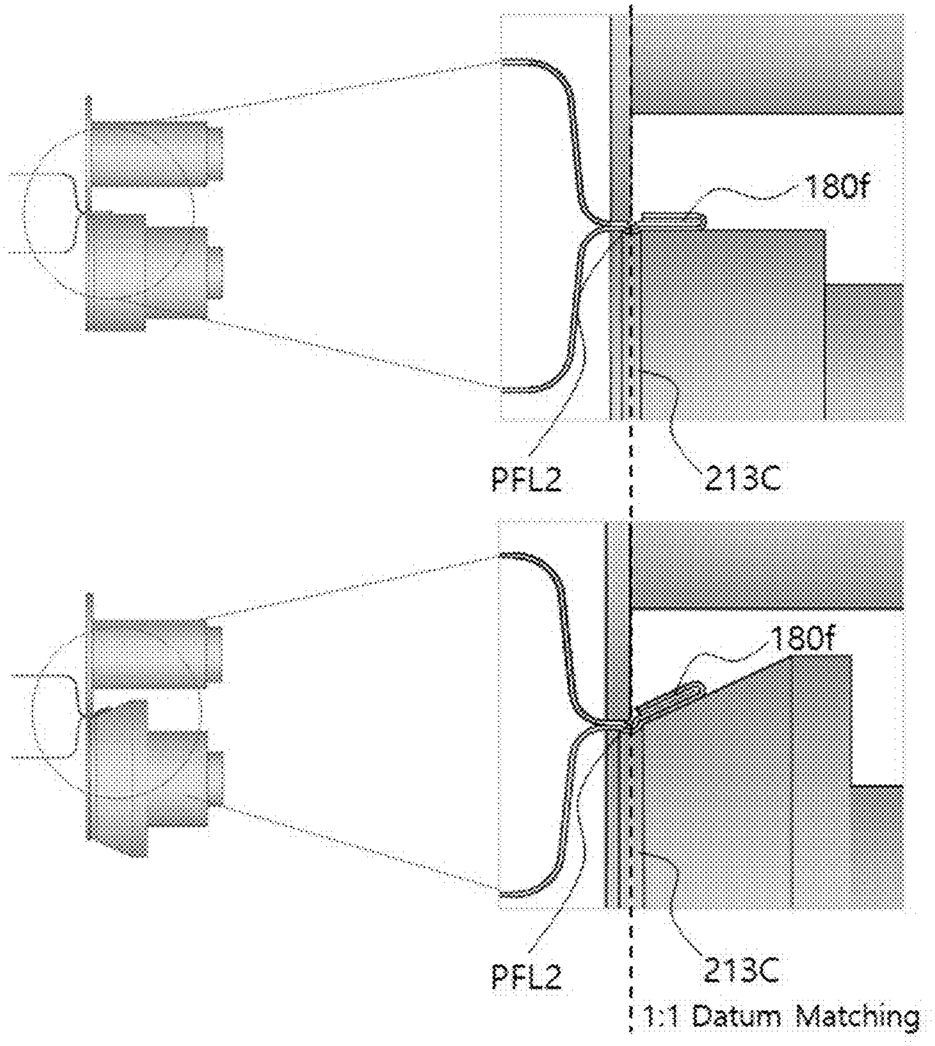
FIG. 11 illustrates the third unit roller of FIG. 10A and the third unit roller of FIG. 10C.
Figure 12A:
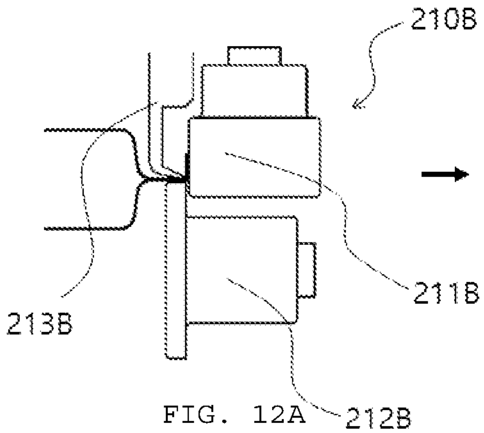
FIGS. 12A to 12D illustrate side surfaces of second unit rollers of a second folding unit.
Figure 12B:
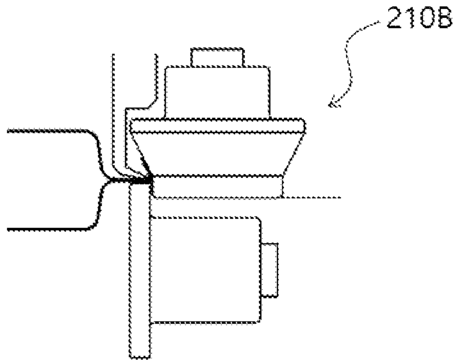
Figure 12C:
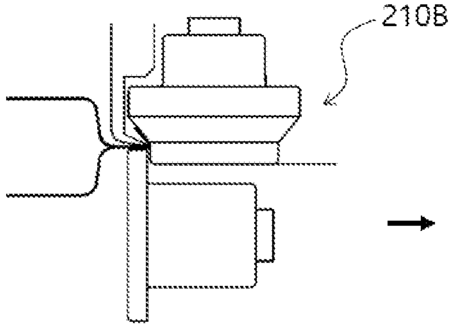
Figure 12D:
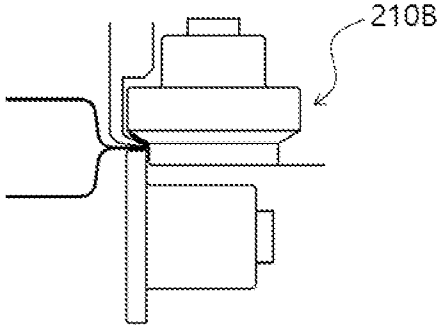

FIGS. 10A to 10D illustrate side surfaces of the third unit rollers of the third folding unit, and FIG. 11 illustrates the third unit roller (upper portion of FIG. 11) of FIG. 10A and the third unit roller (lower portion of FIG. 11) of FIG. 10C. The third unit roller 210C may basically have the same structure as that of the first unit roller 210A, an accommodating groove 213C in which a portion protruding downward of the second pre-folding line PFL2 is accommodated may be formed in the lower roller 212C of the third unit roller, and the accommodating groove 213C of the lower roller of the third unit roller may be formed inside the accommodating groove 213A of the lower roller of the first unit roller.

Meanwhile, unlike the above, before the pouch wing w is initially folded by 90°, the first and second pre-folding lines PFL1 and PFL2 may be formed on the pouch wing w by one heating press 110B, and two accommodating grooves in which protruding portions of the first and second pre-folding lines PFL1 and PFL2 are accommodated may be formed in the lower roller 212A of the first folding unit to more firmly guide the pouch wing w at the time of folding the pouch wing w.

FIGS. 12A to 12D illustrate side surfaces of second unit rollers of the second folding unit. The second folding unit 200B may also include a plurality of second unit rollers 210B along the direction in which the pouch case is transported, and each of the second unit rollers may include an upper roller 211B, a lower roller 212B, and a stripper 213B provided on one side of the upper roller 211B to perform a folding guide function of the pouch wing w. The stripper 213B may support a folded portion of the pouch wing w, that is, the concave portion of the first pre-folding line PFL1 to allow the pouch wing w to be folded on the basis of the first pre-folding line PFL1.

Figure 13:
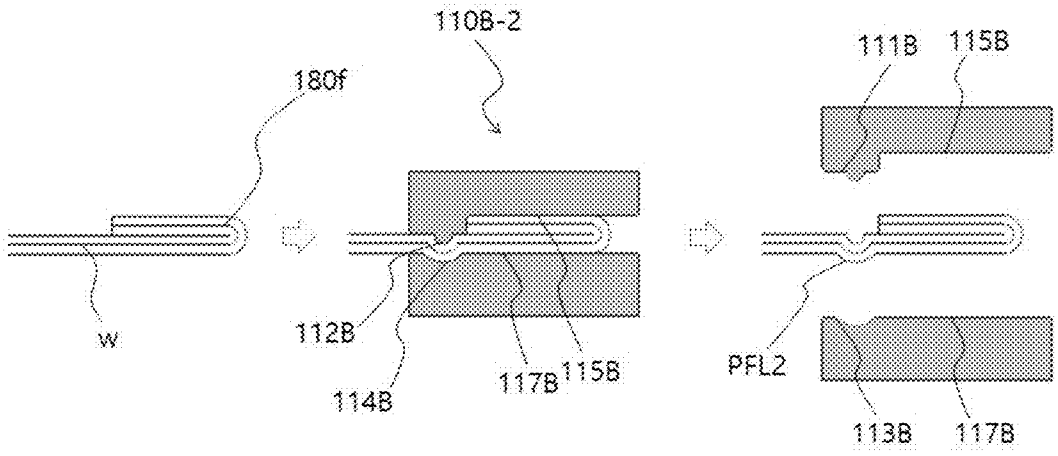
FIG. 13 illustrates forming a second pre-folding line on the pouch wing folded by 180°.

FIG. 13 illustrates forming a second pre-folding line on the pouch wing folded by 180°, and the second heating press 110B-2 forming the second pre-folding line PFL2 is illustrated. The first heating press 110B-1 may form the first pre-folding line PFL1 on the pouch wing w before the first folding unit 200A folds the pouch wing w by 90°, and the second heating press 110B-2 may form the second pre-folding line PFL2 on the pouch wing w after the second folding unit 200B folds the pouch wing w by 180° and before the third folding unit 200C additionally folds the pouch wing w by 90°. In this case, the second heating press 110B-2 may include a folded portion upper pressing surface 115B and a folded portion lower pressing surface 117B that compress a 180° folded portion **180*f* of the pouch wing formed by folding the pouch wing w by 180°, the folded portion upper pressing surface 155B may be formed at a position higher than the upper pressing surface 111B pressing the pouch wing w from the top rather than the 180° folded portion 180*f*, and the folded portion lower pressing surface 117B may be formed on the same line as the lower pressing surface 113B pressing the pouch wing w from the bottom rather than the 180° folded portion 180*f*. As described above, the second heating press 110B-2 is capable of pressing the 180° folded portion 180*f*, such that the 180° folded portion 180*f* of the pouch wing may be compressed simultaneously with forming the second pre-folding line PFL2 through the compression of the second heating press 110B-2**.

Figure 14:
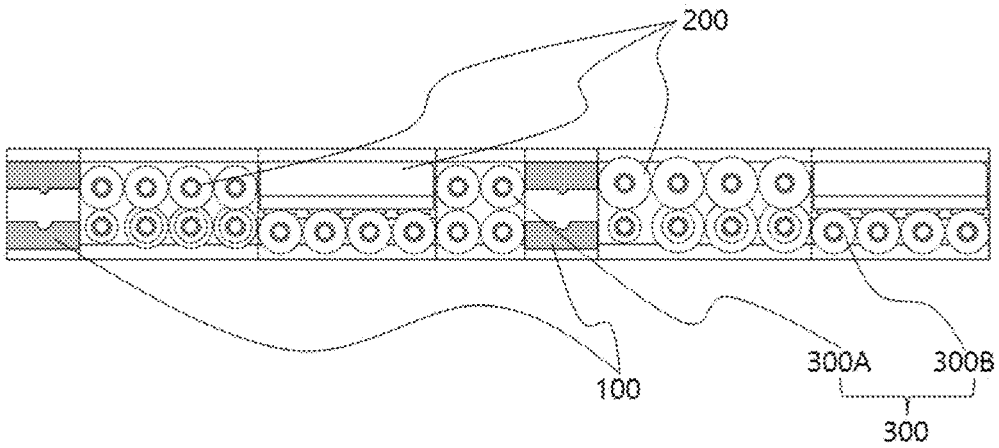
FIG. 14 illustrates an apparatus of folding a pouch case according to an embodiment of the present invention.

FIG. 14 illustrates an apparatus of folding a pouch case according to an embodiment of the present invention. The apparatus of folding a pouch case according to an embodiment of the present invention may mainly include a line forming unit 100 and a folding unit 200, and may further include a compressing unit 300 including a first compressing unit 300A compressing a 180° folded portion **180*f* of a pouch wing folded by 180° and a second compressing unit 300B compressing a 90° folded portion 90*f* of the pouch wing folded by 90°. The compressing unit 300 may also include a plurality of unit rollers 310 arranged along a transport path of the pouch case and each including an upper roller 311 and a lower roller 312**.

As described above, according to the present invention, the first pre-folding line is formed before the pouch wing is folded and the pouch wing is folded by 180° on the basis of the first pre-folding line, and the second pre-folding line is formed before the pouch wing folded by 180° is folded and the pouch wing is additionally folded by 90° on the basis of the second pre-folding line, such that a difference in an elongation amount at each position of the pouch wing at the time of folding the pouch wing may be overcome, and a meandering of the folding line may be certainly prevented.

Hereinafter, a method of folding a pouch case according to an embodiment of the present invention will be described. The method of folding a pouch case according to an embodiment of the present invention may include forming the pre-folding line recessed at a predetermined depth along the length direction of the pouch wing on the pouch wing; and folding the pouch wing on which the pre-folding line is formed, on the basis of the pre-folding line.

Figure 15:
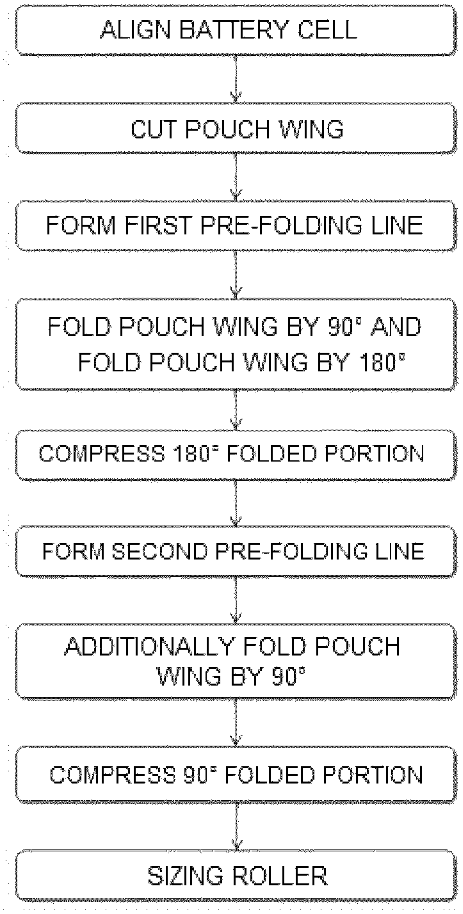
FIG. 15 illustrates a flowchart of a method of folding a pouch case according to an embodiment of the present invention.

FIG. 15 illustrates a flowchart of a method of folding a pouch case according to an embodiment of the present invention. The battery cell (that is, the pouch case in which the electrode assembly is accommodated and the packaging-side-sealing is performed) may be aligned, a side end portion of the pouch wing may be finally cut, the first pre-folding line may be formed on the pouch wing by the first line forming unit, the pouch wing on which the first pre-folding line is formed may be folded by 180° by folding the pouch wing by 90° and folding the pouch wing folded by 90° by 90° by the first and second folding units, the 180° folded portion of the pouch wing formed by folding the pouch wing by 180° may be compressed by the first compressing unit, the second pre-folding line may be formed on the pouch wing in which the 180° folded portion is compressed, by the second line forming unit, the pouch wing on which the second pre-folding line is formed may be additionally folded by 90° by the third folding unit, the 90° folded portion of the pouch wing formed by additionally folding the pouch wing by 90° may be compressed by the second compressing unit, and the pouch case may pass through a sizing roller.

That is, the method of folding a pouch case according to an embodiment of the present invention may mainly include forming the pre-folding line on the pouch wing before folding the pouch wing and folding the pouch wing on the basis of the first pre-folding line, wherein the forming of the pre-folding line on the pouch wing may include forming the first pre-folding line on the pouch wing and forming the second pre-folding line on the pouch wing, and the folding of the pouch wing may include folding the pouch wing on which the first pre-folding line is formed, by 90°, folding the pouch wing folded by 90° by 180°, and additionally folding the pouch wing folded by 180° by 90°.

Here, the first pre-folding line may be formed on the sealing surface of the pouch wing, the second pre-folding line may be formed on the non-sealing surface of the pouch wing, and a heat and a pressure applied to the pouch wing in order to form the second pre-folding line may be lower than a heat and a pressure applied to the pouch wing in order to form the first pre-folding line.

Further, in the forming of the second pre-folding line on the pouch wing folded by 180°, the compression of the 180° folded portion of the pouch wing formed by folding the pouch wing by 180° may be simultaneously performed.

The method of folding a pouch case according to an embodiment of the present invention may further include aligning the pouch case and finally cutting the side end portion of the pouch, before the forming of the first pre-folding line, compressing a pouch wing folded portion formed by folding the pouch wing by 180°, after the folding of the pouch wing by 180°, compressing a pouch wing folded portion formed by additionally folding the pouch wing by 90°, after the additional folding of the pouch wing by 90°, and passing the pouch case through the sizing roller in order to make a size of the pouch case uniform, after the compressing of the pouch wing folded portion formed by additionally folding the pouch wing by 90°. As a result, the pouch wing may be folded to finally manufacture the battery cell.

Meanwhile, in the present invention, at the time of folding the pouch case, in the pouch wings formed on both sides of the pouch body, the pouch wing formed on one side of the pouch body may be first folded, a transport direction of the pouch case may be changed, and the pouch wing formed on the other side of the pouch body may then be folded. In addition, a case where the pouch wings extend from the pouch body to both sides has been described in the present invention, but the present invention may also be applied to a case where the pouch case is bent to surround a long side of one side of the electrode assembly, such that the pouch wing is formed only on one side of the pouch body.

It is possible to prevent a meandering in a folding process and reduce non-uniformity of a folding amount by forming the pre-folding line on the pouch wing and folding the pouch wing on the basis of the pre-folding line, in folding the pouch case.

Although embodiments of the present invention have been hereinabove described with reference to the accompanying drawings, those skilled in the art to which the present invention pertains will be able to understand that the present invention may be implemented in other specific forms without departing from the spirit or essential feature of the present invention. Therefore, it is to be understood that embodiments described hereinabove are illustrative rather than being restrictive in all aspects.

What is claimed is:

1. A folding unit for folding a pouch wing of a secondary battery,
- wherein the secondary battery includes a pouch case accommodating an electrode assembly, the pouch case including a pouch body in which an electrode assembly is accommodated and a pouch wing extending from the pouch body,
- wherein a pre-folding line
- is formed on the pouch wing along a length direction of the pouch wing, the pre- folding line having one surface recessed to a predetermined depth and an opposite surface protruding downward, and
- wherein the folding unit includes a plurality of unit rollers arranged along a path along which the pouch case is transported,
- wherein at least one of the plurality of unit rollers includes an upper roller and a lower roller, and the lower roller is provided with an accommodating groove configured to receive a portion of the pre-folding line protruding downward,
- wherein the folding unit is configured to fold the pouch wing on the basis of the pre-folding line.

2. The folding unit of claim 1, wherein the lower roller is formed so that an outer side of the accommodating groove has a predetermined angle with respect to a horizontal direction.

3. The folding unit of claim 1, wherein a first pre-folding line and second pre-folding line are formed on the pouch wing.

4. The folding unit of claim 3, wherein the folding unit includes a first folding unit folding the pouch wing on which the first pre-folding line is formed, by 90°, a second folding unit folding the pouch wing folded by 90° by 180°, and a third folding unit additionally folding the pouch wing folded by 180° by 90°, and
- the first folding unit folds the pouch wing by 90° on the basis of the first pre-folding line, the second folding unit folds the pouch wing folded by 90° on the basis of the first pre-folding line by 180°, and the third folding unit additionally folds the pouch wing folded by 180° by 90° on the basis of the second folding line.

5. The folding unit of claim 4, wherein the first folding unit includes a plurality of first unit rollers arranged along the path through which the secondary battery is transported, each of the plurality of first unit rollers including an upper roller and a lower roller, the third folding unit includes a plurality of third unit rollers arranged along the path through which the secondary battery is transported, each of the plurality of third unit rollers including an upper roller and a lower roller, and an accommodating groove in which a portion protruding downward of the first pre-folding line is formed in the lower roller of the first unit roller, and an accommodating groove in which a portion protruding downward of the second pre-folding lie is formed in the lower roller of the third unit roller.

6. The folding unit of claim 4, wherein the first folding unit includes a plurality of unit rollers arranged along the path through which the secondary battery is transported, each of the plurality of first unit rollers including an upper roller and a lower roller, and wherein two accommodating grooves are formed in the lower roller of the first unit roller, and each accommodating groove accommodates a portion protruding downward each of the first pre-folding line and the second pre-folding line.

* * * * *